US008444212B2

(12) United States Patent
Schröter (10) Patent No.: US 8,444,212 B2
(45) Date of Patent: May 21, 2013

(54) DRIVER PROTECTION SYSTEM FOR A VEHICLE (75) Inventor: Oliver Schröter, Mülheim an der Ruhr (DE)

(73) Assignee: IWS Ingenieurgesellschaft Weiner & Schroeter mbH, Kamp-Lintfort (DE)

( * ) Notice: Subject to any disclaimer, the term of this patent is extended or adjusted under 35 U.S.C. 154(b) by 42 days.

(21) Appl. No.: 12/992,153

(22) PCT Filed: May 11, 2009

(86) PCT No.: PCT/EP2009/055667
§ 371 (c)(1),
(2), (4) Date: Nov. 11, 2010

(87) PCT Pub. No.: WO2009/138380
PCT Pub. Date: Nov. 19, 2009

(65) Prior Publication Data
US 2011/0068600 A1  Mar. 24, 2011

(30) Foreign Application Priority Data
May 15, 2008 (DE) .......................... 10 2008 023 750

(51) Int. Cl.
*B60R 21/02* (2006.01)
*B60J 5/04* (2006.01)

(52) U.S. Cl.
USPC .................. 296/190.03; 296/190.11; 280/748

(58) Field of Classification Search
USPC ................... 296/190.11, 147, 146.13, 146.1, 296/146.5, 146.6, 190.3; 49/62, 50, 64, 56, 49/70, 98; 280/749, 748, 756
See application file for complete search history.

(56) References Cited

U.S. PATENT DOCUMENTS

| | | | |
|---|---|---|---|
| 3,837,670 A | | 9/1974 | Hilyard |
| 4,062,566 A | * | 12/1977 | Hensler et al. ................. 280/751 |
| 4,130,298 A | * | 12/1978 | Shaunnessey .............. 280/730.1 |
| 5,035,094 A | | 7/1991 | Legare |
| 5,279,084 A | * | 1/1994 | Atsukawa ........................ 52/118 |
| 5,454,596 A | * | 10/1995 | Dirck ............................ 280/748 |

(Continued)

FOREIGN PATENT DOCUMENTS

| | | |
|---|---|---|
| DE | 200 02 106 U1 | 4/2000 |
| DE | 200 20 521 U1 | 2/2001 |

(Continued)

OTHER PUBLICATIONS

Deutsches Patent—und Markenamt, Office Action for German Patent Application No. 10 2008-023 750.7-22, mailed on Mar. 10, 2009.

(Continued)

*Primary Examiner* — Glenn Dayoan
*Assistant Examiner* — Sunsurraye Westbrook
(74) *Attorney, Agent, or Firm* — Cahn & Samuels, LLP (57) ABSTRACT

The invention concerns a driver protection system for a vehicle comprising a restraining bow frame (7) which is pivotable about a pivot axis between a securing position in which the restraining bow frame (7) secures a driver from falling out of the vehicle and a release position in which the restraining bow frame (7) permits the driver to climb out of the vehicle, wherein the restraining bow frame (7) in the release position is displaced relative to the securing position in the direction of the pivot axis.

26 Claims, 11 Drawing Sheets

U.S. PATENT DOCUMENTS

| | | | |
|---|---|---|---|
| 6,902,024 B2 * | 6/2005 | Müller et al. | 180/271 |
| 7,097,237 B2 * | 8/2006 | Weiner et al. | 296/190.11 |
| 7,429,075 B2 * | 9/2008 | Turnbull et al. | 296/190.11 |
| 2002/0153718 A1 | 10/2002 | Schneider | |
| 2003/0136599 A1 | 7/2003 | Sauermann | |
| 2003/0168902 A1 | 9/2003 | Wiener et al. | |
| 2004/0173041 A1 | 9/2004 | Said | |

FOREIGN PATENT DOCUMENTS

| | | |
|---|---|---|
| DE | 101 14 180 A1 | 9/2002 |
| EP | 1 305 192 B1 | 5/2003 |
| EP | 1 686 015 A2 | 8/2006 |

OTHER PUBLICATIONS

International Preliminary Report on Patentability for PCT Application No. PCT/EP2009/055667, mailed on Nov. 17, 2010.

Espacenet, English abstract of DE 10114180 (A1), Sep. 26, 2002.

* cited by examiner

DRIVER PROTECTION SYSTEM FOR A VEHICLE

I. BACKGROUND OF THE INVENTION

1. Field of the invention

This application is the National Stage of International Application No. PCT/EP2009/055667, filed on May 11, 2009, which claimed the benefit of German Application No. DE 10 2008 023 750.7 filed May 15, 2008, which are hereby both incorporated by reference. The International Application No. PCT/EP2009/055667 was published on Nov. 19, 2009.

The present invention concerns a driver protection system for a vehicle, in particular for a utility vehicle such as for example a fork lift truck, a tractor or a construction-site or agricultural machine.

2. State of the art

Various driver protection systems are known in commercial and utility vehicle such as fork lift trucks for protecting the driver from injury for example in the case of accidents caused by load or centrifugal force or tipping of the vehicle caused by the carriageway.

EP 1 305 192 B1 discloses a driver protection system which includes a bow frame which is pivotably mounted with a hinge to a pillar of the vehicle and is held to the other pillar by means of a locking system. That system has proven good in practice in regard to the reliable protection effect which is achieved even in relation to different body sizes, while ensuring adequate freedom of movement for the driver.

It is precisely in relation to fork lift trucks that in addition from time to time there is a need to be able to open the vehicle or driver protection system, even in constricted space situations. Thus for example for taking goods from block warehouses with pallets stacked one beside, one behind and one above the other, a fork lift truck driver can control the vehicle in regions in which the available width substantially only corresponds to the width of a pallet. Similarly constricted space situations can also occur for example when loading and unloading the load platform of a truck.

Constricted space situations also arise during the electric charging operation for electrically operated fork lift trucks as in that case the vehicles are generally placed closely beside each other at the respective charging stations and are connected to charging units which are closely adjacent to each other. As from time to time the vehicle hood has to be temporarily opened during that charging operation to permit charging gases to escape, in which case the driver protection system is then possibly a hindrance, an opening option for the driver protection system may also be desirable in such situations, in constricted space conditions.

For example DE 200 20 521 U1 discloses a safety device for vehicles, in which pivotal movement of protection bows is effected about an axis extending horizontally transversely with respect to the direction of travel or the longitudinal direction of the vehicle, in which case the protection bows in the rest position are disposed approximately vertically and in the safety position they are disposed approximately horizontally.

Such known systems however suffer from the disadvantage that either the protection bow must be kept relatively short in order to avoid hitting against the upper roof member when the protection bow is opened, whereby the region of protection for the driver in the safety position is reduced, or, to permit the pivotal movement, the existing protection bows already project laterally beyond the vehicle contour in the safety position and thus precisely in constricted space situations can be damaged by the driver or even removed.

II. SUMMARY OF THE INVENTION

Having regard to that background an object of the present invention is to provide a driver protection system for a vehicle, which even under constricted space situations permits the driver to temporarily climb out and which at the same time in the safety position still ensures a reliable protection effect.

That object is attained in accordance with a driver protection system for a vehicle comprising: a restraining bow frame (7) which is pivotable about a pivot axis between a securing position in which the restraining bow frame (7) secures a driver from falling out of the vehicle and a release position in which the restraining bow frame (7) permits the driver to climb out of the vehicle; wherein the restraining bow frame (7) in the release position is displaced relative to the securing position in the direction of the pivot axis.

A driver protection system for a vehicle comprises a restraining bow frame which is pivotable about a pivot axis between a securing position in which the restraining bow frame secures a driver from falling out of the vehicle and a release position in which the restraining bow frame permits the driver to climb out of the vehicle, wherein the restraining bow frame in the release position is displaced relative to the securing position in the direction of the pivot axis.

The fact that, in accordance with the invention, transfer of the restraining bow frame into the release position, which is advantageous in constricted space situations, by means of the pivotal movement about a pivot axis (which in an embodiment in particular extends transversely relative to the vehicle longitudinal direction) is combined with a displacement of the restraining bow frame in the direction of or along the pivot axis provides that said pivotal movement of the restraining bow frame into the release position can be effected without the restraining bow frame already having to be disposed for that purpose in its securing position entirely or also only partially outside the vehicle contour. With the driver protection system according to the invention, any impediment to the pivotal movement by components of the restraining bow frame which are relevant to safety or which serve for comfort purposes do not already have to be taken into account in the securing position (that is to say for example in the travel mode), but impediment of the pivotal or upward movement can be avoided by virtue of the axial displacement.

The expression to the effect that the restraining bow frame is displaced in the direction of the pivot axis denotes here and hereinafter that the invention also embraces certain deviations (for example of less than 10°, preferably less than 5°, still more preferably less than 2°) between the direction in which the displacement occurs and the exact position of the pivot axis. In addition the respective axes of the pivotal movement and the displacement can also be arranged displaced both vertically and also horizontally (and parallel to each other).

In an embodiment the restraining bow frame in the release position assumes an at least approximately vertical or upright position. The expression 'at least approximately' is used here to mean that this also still embraces certain deviations from the vertical or the upright position through an angle of a maximum of 20°, in particular a maximum of 10° and further in particular a maximum of 5°.

In particular the restraining bow frame in the release position can be substantially upright relative to the securing position. In that respect it is to be noted that the invention is not limited to an upward pivotal movement of the restraining bow frame for transferring it into the release position, but in a further embodiment the restraining bow frame can also be pivoted away from the driver downwardly or in a downward direction. Such a position for the restraining bow frame, which is attained by downward pivotal movement of the restraining bow frame, is thus also to be interpreted as a vertical or 'upright position' in the foregoing sense.

In an embodiment the restraining bow frame performs a movement in the direction of its pivot axis in the pivotal movement. That movement can be assisted in particular, as is described in greater detail hereinafter, by a force transmission element such as for example a compression spring.

In an embodiment the pivotal movement of the restraining bow frame from the securing position into the release position is effected with a pivotal angle of 90°±20°, in particular 90°±10°, further in particular precisely 90°.

In an embodiment the pivot axis is inclined with respect to the horizontal. In that case the angle of inclination of that inclination can be in particular at least 1° and is preferably in the range of between 2° and 6°.

In an embodiment the restraining bow frame is mounted to the vehicle in such a way that superimposed on the pivotal movement is a translatory movement of the restraining bow frame, that is directed transversely relative to the longitudinal direction of the vehicle. In other words, transfer of the restraining bow frame out of the securing position into the release position is effected by means of a combined pivotal and translatory movement, wherein the translatory movement is transverse relative to the longitudinal direction of the vehicle or axial in the direction of the pivot axis and in that case is implemented automatically and simultaneously with the pivotal movement.

In an alternative embodiment the translatory movement can also be effected independently or separately from the pivotal movement insofar as for example the restraining bow frame is initially axially displaced out of the securing position in the direction of the pivot axis and is only then pivoted into the upright or release position.

In an embodiment the restraining bow frame in the securing position is disposed at least partially still within the vehicle contour. In addition the restraining bow frame in the release position can be disposed completely outside the vehicle contour. In that case, arrangements of the aforementioned criteria are also to be deemed to be included, in which the restraining bow frame is still disposed outside or still within the vehicle contour to a comparatively slight relative amount (for example up to less than 10% of its maximum extent in the direction in question transversely with respect to the longitudinal direction of the vehicle).

In an embodiment, a lateral opening is provided in the vehicle for the driver to exit, in which case the restraining bow frame in the securing position extends in the longitudinal direction of the vehicle substantially over the entire extent of the lateral opening at the level of the restraining bow frame. That reliably prevents the driver from being able to jump off the vehicle in a dangerous situation by way of an unsecured region of the exit opening. In that case use is particularly advantageously made of the effect according to the invention, that, even under constricted conditions, as a consequence of the above-described sequence of movements, when opening the restraining bow frame, the driver protection system permits the driver to temporarily exit from the vehicle. Consequently there is no need to leave a region unsecured to permit the driver to exit in constricted conditions for example by virtue of the restraining bow frame being of a shortened structure, and the level of safety is further increased with the system according to the invention. In addition in that way to further increase the level of safety, the restraining bow frame can be locked in its region which is at the front in the longitudinal direction of the vehicle, whereby the lateral opening or the vehicle contour is completely closed forwardly in the longitudinal direction of the vehicle.

In an embodiment the restraining bow frame is held releasably in the securing position to a pillar of the vehicle by way of a locking system.

In an embodiment the restraining bow frame is pivotably mounted to a pillar of the vehicle by means of at least one spring element which can be for example in the form of a spring steel plate, wherein that spring element is biased in the securing position. In that case in particular the restraining bow frame can be transferred from its position of being oriented in the longitudinal direction of the vehicle into an at least partially sideways opened position by the spring element after release of the locking system. Preferably in that case the restraining bow frame in that at least partially sideways opened position is at least partially still within the vehicle contour.

In an embodiment the displacement when the restraining bow frame moves from the securing into the release position in the direction of the pivot axis is by a distance of at least 15 mm, preferably at least 30 mm, further preferably at least 40 mm.

In an embodiment the pivot axis is inclined with respect to the horizontal through an angle of at least 1°, preferably in the range of between 2° and 6°. In that respect that inclination is preferably upwardly (viewed from the vehicle interior in the direction towards the vehicle contour) if the movement from the securing position into the release position is effected as described hereinbefore by means of an upward pivotal movement of the restraining bow frame. In a corresponding fashion, for the situation where the restraining bow frame is pivoted away by the driver downwardly or in a downward direction from the securing position into the release position, the inclination is preferably downwardly (viewed from the vehicle interior towards the vehicle contour).

As is described in greater detail hereinafter, the above-described inclination can provide that an opening movement of the restraining bow frame out of the vehicle contour, which is caused after release of the locking system at the beginning of the upward movement of the restraining bow frame by the spring elements, is compensated again towards the end of the pivotal movement, and therefore the restraining bow frame with its initially sideways-projecting portion is moved again to the vehicle and inclined positioning of the restraining bow frame in the release position, which is possibly causing trouble, is avoided.

In an embodiment the restraining bow frame is secured to the vehicle by way of a compression spring causing the displacement of the restraining bow frame in the direction of the pivot axis.

In an embodiment the restraining bow frame is secured to the vehicle by way of a device or a rotary guide element which is so adapted that it superimposes on the pivotal movement of the restraining bow frame a translatory movement for producing the displacement or axial movement of the restraining bow frame.

The rotary guide element described in greater detail hereinafter, which combines a defined rotary movement or rotation about an axis with an axial movement or translatory movement along that axis, can basically be advantageously employed for any uses and is not limited to use in connection with the driver protection system according to the invention.

In a further aspect therefore the invention also concerns a device for coupling two components together, in particular (but not necessarily) for use in a driver protection system having the foregoing features, comprising a first subelement for fixing to a first component, and a second subelement for fixing to a second component, wherein the first subelement and the second subelement are operatively connected together in such a way that a relative movement along an element axis of the apparatus between the first subelement and the second subelement is necessarily accompanied by a rotary movement of the first subelement and the second subelement relative to each other about the element axis.

In an embodiment the first subelement and the second subelement are arranged coaxially in relation to a common axis which in particular can be the element axis.

In an embodiment the apparatus further has a force transmission element for the transmission of a force causing the relative movement to the first subelement and the second subelement. That force transmission element can be for example in the form of a compression spring.

In an embodiment the first subelement is in the form of a first hollow cylinder and the second subelement is in the form of a second hollow cylinder mounted concentrically relative to the first hollow cylinder.

In an embodiment the concentric mounting of the first hollow cylinder in relation to the second hollow cylinder is effected by way of a ball rolling mounting.

The invention further also concerns a vehicle, in particular a fork lift truck, comprising a driver protection system or an apparatus having the above-described features.

Further configurations of the invention are to be found in the description and the appendant claims. The invention is described in greater detail hereinafter by means of an embodiment illustrated in the accompanying drawing.

IV. DESCRIPTION OF PREFERRED EMBODIMENTS

Figure 1A:
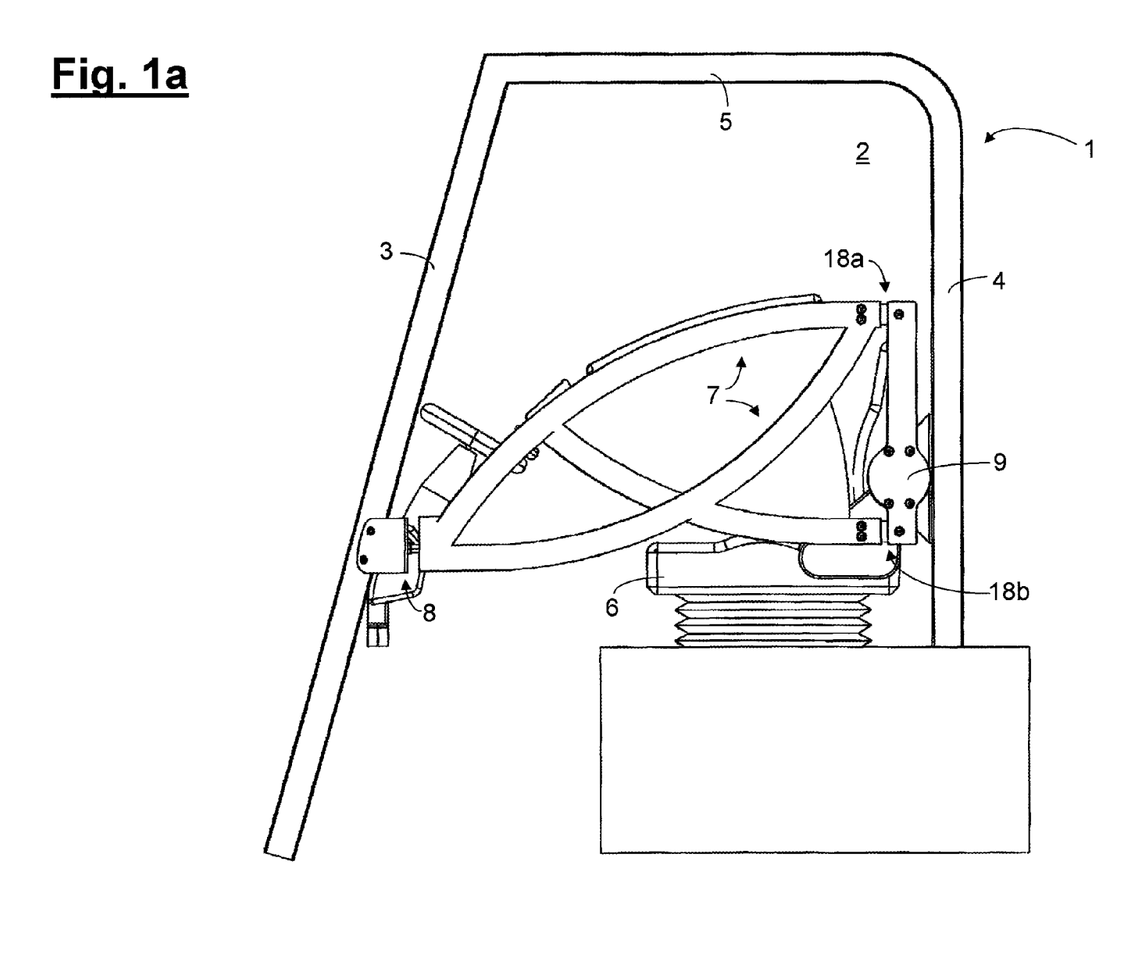
FIGS. 1a-c show diagrammatic views of a driver protection system according to the invention in a first position as a side view (FIG. 1a), a rear view (FIG. 1b) and a front view (FIG. 1c)

FIG. 1a shows a side view of a driver protection roof 1 for a fork lift truck with installed driver protection system in an embodiment of the present invention. The driver protection roof 1 has a lateral opening 2 which is delimited by a front pillar 3 (A-pillar), a rear pillar 4 (B-pillar) and an upper transverse frame member 5, as well as a vehicle seat 6.

Figure 2A:
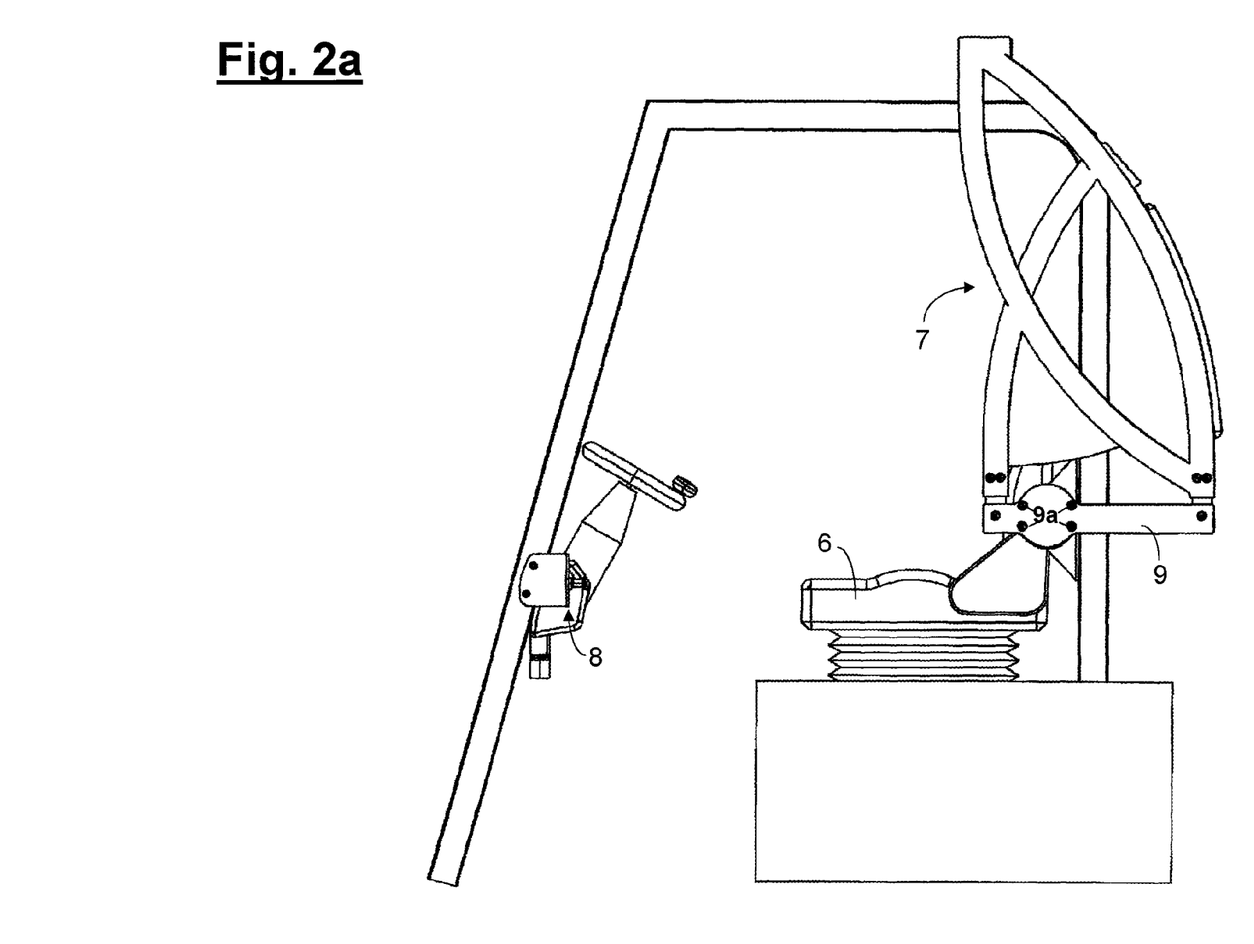
FIGS. 2a-c show diagrammatic views of a driver protection system according to the invention in a second position as a side view (FIG. 2a), a rear view (FIG. 2b) and a front view (FIG. 2c)

An essential component of the driver protection system according to the invention is a restraining bow frame 7 which is releasably held or locked to the front pillar 3 in the securing position of the retraining bow frame 7 by way of a locking system 8 and which at its opposite end portion is mounted by way of a rotary guide element 10 described in greater detail hereinafter with reference to FIGS. 4a-d and a carrier element 9 fixedly connected to said rotary guide element 10, to the vehicle (in particular by way of the carrier plate 19 on the rear pillar 4) in such a way that the restraining bow frame 7 is pivotable from the position shown in FIG. 1a about an almost horizontal pivot axis extending transversely relative to the direction of travel or the longitudinal direction of the vehicle into the release position which is shown in FIG. 2a and which permits the driver to exit, wherein the restraining bow frame 7 is also displaced in the release position in the direction of (that is to say) along the pivot axis.

Figure 3:
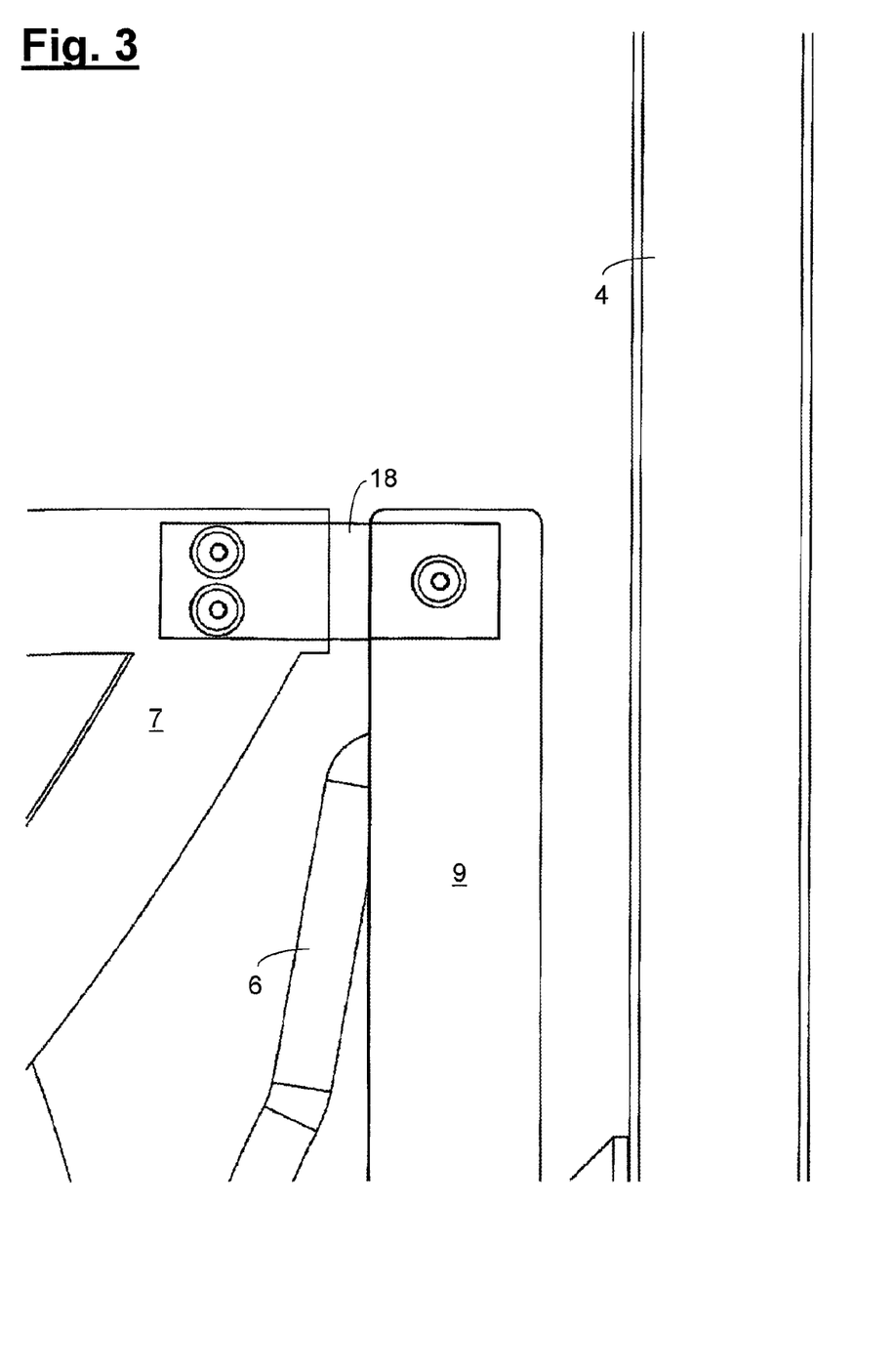
FIG. 3 shows a detail view on an enlarged scale of a spring element in the driver protection system of FIGS. 1 and 2, and FIGS. 4a-d show diagrammatic exploded views to illustrate the structure of a rotary guide element in the driver protection system of FIGS. 1 and 2 as a perspective view (FIGS. 4a-b), a side view (FIG. 4c) and a rear view (FIG. 4d).

The restraining bow frame 7 is pivotably mounted to the vehicle at its end portion opposite to the locking system 8 in the securing position (that is to say the pivotal mounting is in particular to the pillar 4), as shown diagrammatically in FIG. 3, by means of spring elements 18 which in the illustrated embodiment are in the form of substantially tongue-shaped spring steel plates. The illustrated embodiment has two such spring elements 18 which are identical to each other and are of a configuration as shown in FIG. 3 and fix the restraining bow frame 7 at the positions identified by 18a and 18b in FIG. 1a to both end portions of the carrier element 9 by way of screw connections.

In this case the spring elements 18 are held under stress when the locking system 8 is closed in such a way that when the locking system 8 is opened, upon returning to their original unstressed position, they open the restraining bow frame 7 by a few degrees (in the illustrated embodiment at an angle of about 5°) so that after that opening movement in the position shown in FIG. 1a the restraining bow frame 7, in its region that is towards the locking system 8, that is to say the front region in the direction of travel, projects laterally outwardly at an angle of about 5° or projects out of the vehicle or cab contour. In its opposite portion at that stage the restraining bow frame 7 with its mounting members present in that region is still disposed within the cab contour so that, without further measures, pivotal movement into the release position in FIGS. 2a-c would not yet be possible.

Figure 1B:
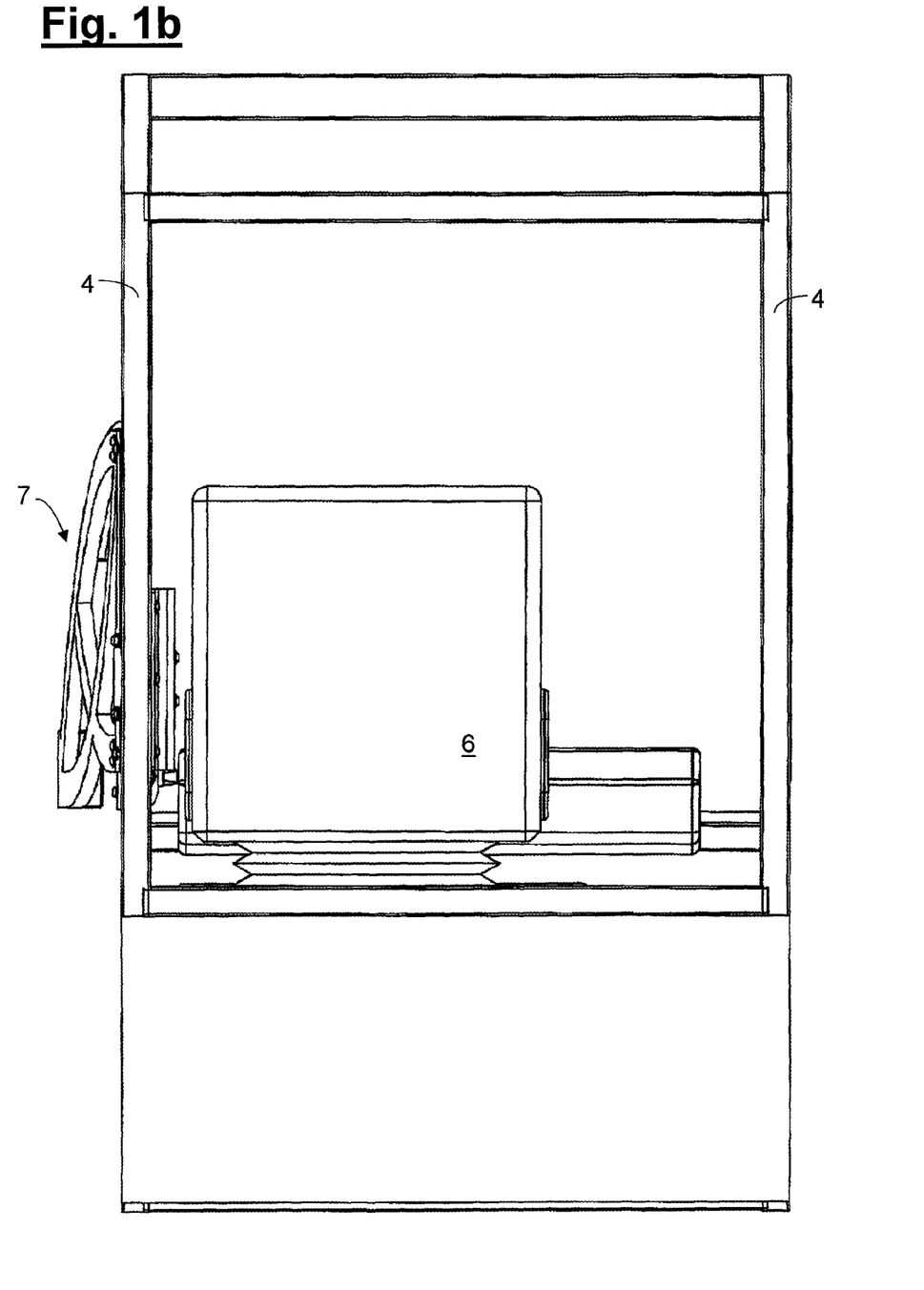
Figure 1C:
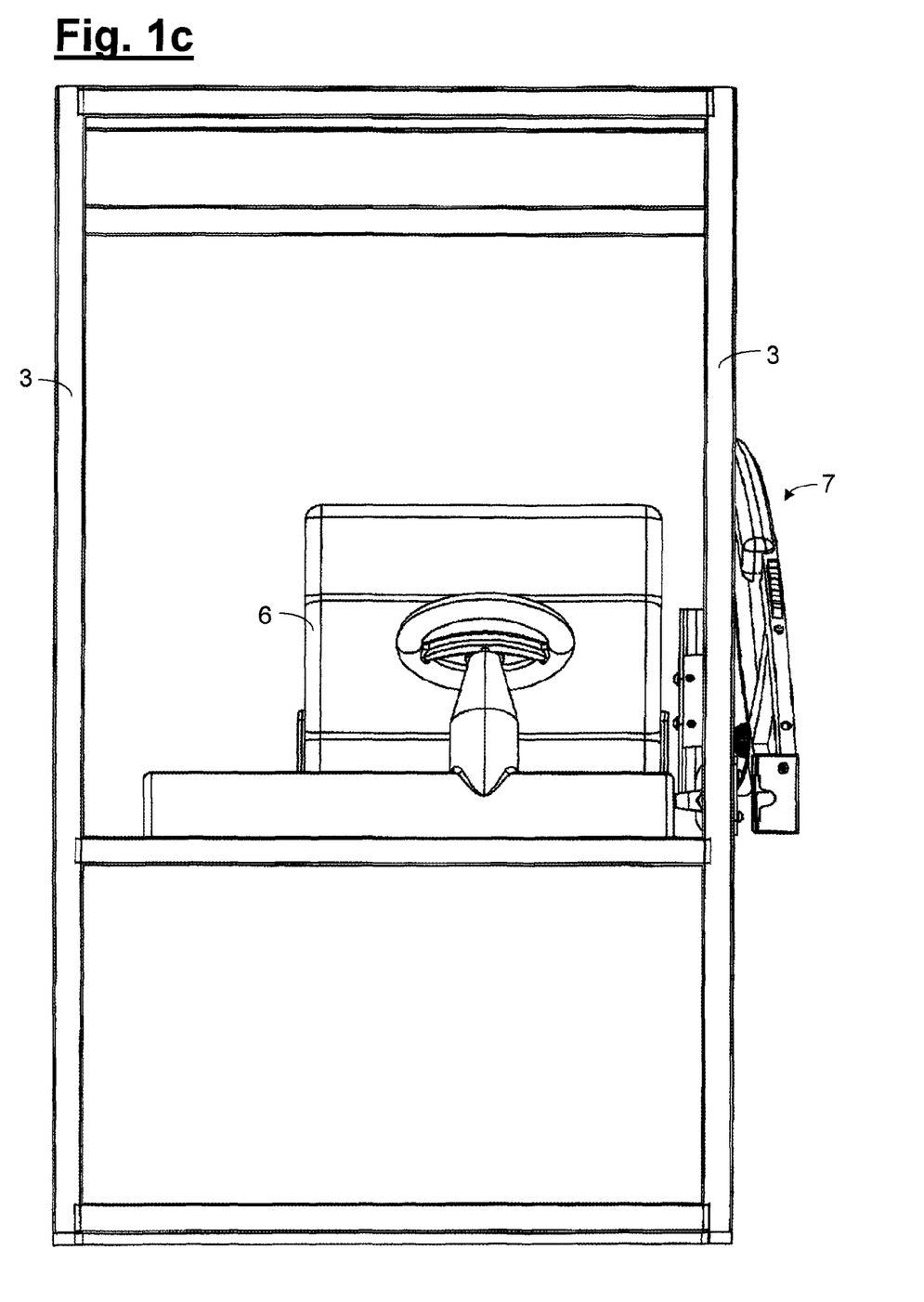
Figure 2B:
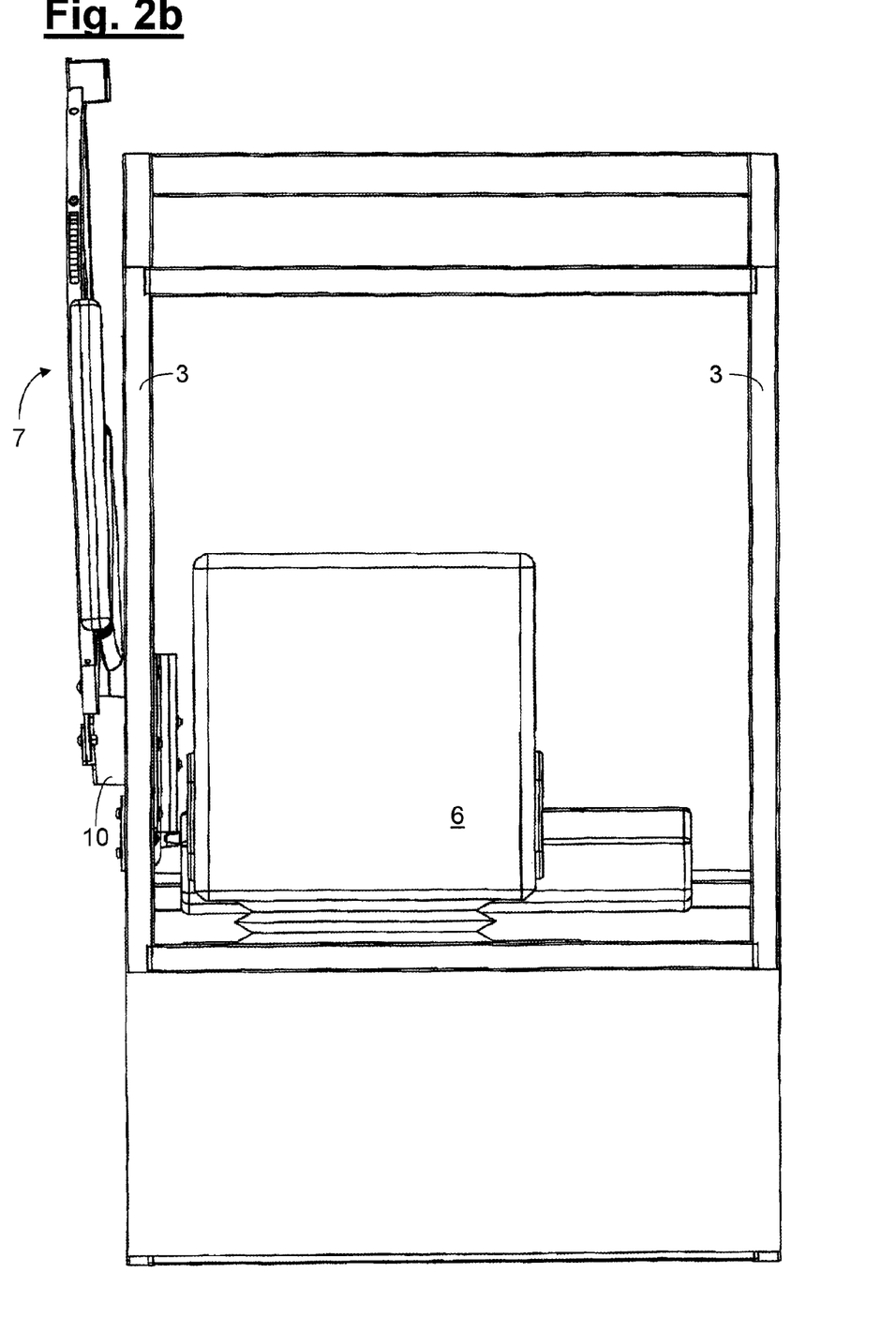
Figure 2C:
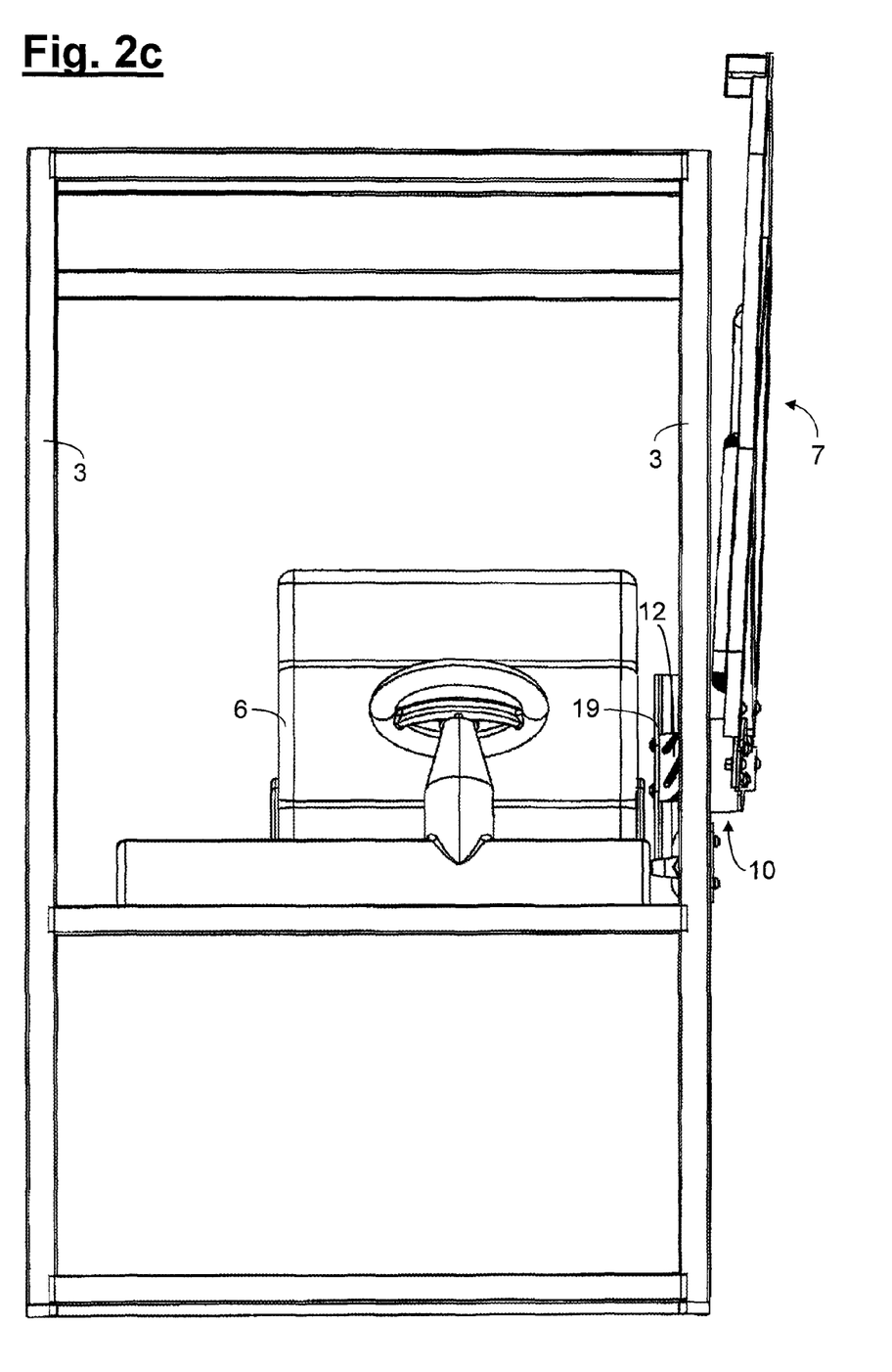

In order to permit that pivotal movement in spite of the restraining bow frame 7 being in the position of being disposed at least partially within the vehicle contour, in the stage shown in FIGS. 1a-c, in accordance with the invention superimposed on the pivotal movement of the restraining bow frame 7 on the vehicle is a translatory movement of the restraining bow frame 7 transversely relative to the direction of travel or the longitudinal direction of the vehicle, to reach the release position shown in FIGS. 2a-c. In the embodiment that combination of pivotal movement and translatory movement is implemented by way of a rotary guide element 10, the structure and function of which are described hereinafter with reference to FIGS. 4a-d.

In the embodiment of FIGS. 4a-d component parts of the rotary guide element 10 are in particular a second hollow cylinder 12, which is an example of a second subelement, that is mounted within a first hollow cylinder 11, which is an example of a first subelement, in concentric relationship therewith, wherein that mounting configuration in the form of a ball rolling mounting is implemented by way of balls 16 arranged in grooves 12a on the outside surface of the second hollow cylinder 12, the balls being supported by way of screws 17 which are of a corresponding hemispherical shape in their end portion and which are introduced into screwthreaded bores 11a on the first cylinder 11. That structure provides a ball rolling mounting in which an axial relative movement between the first hollow cylinder 11 and the second hollow cylinder 12 along the common longitudinal axis forming the element axis of the rotary guide element 10 is accompanied by a rotary movement of the first hollow cylinder 11 about the element axis when the second hollow cylinder 12 is stationary.

Within the first hollow cylinder 11 and the second hollow cylinder 12 the rotary guide element 10 further accommodates a compression spring 13, which is an example of a force transmission element, that in the embodiment surrounds a bar 14 which is provided to prevent the compression spring 13 from buckling during the axial movement and which is concentrically fixedly screwed in the second hollow cylinder 12 and in turn is accommodated by a sleeve 15 which in the assembled condition of the rotary guide element 10, with a further sleeve (not shown) surrounding the sleeve 15, forms a preferably lubricant-free and maintenance-free plain bearing. The sleeve 15 is screwed concentrically in the first hollow cylinder 11.

The first hollow cylinder 11 is fixedly screwed by way of screwthreaded bores 11a to a carrier element 9 forming an outer plate member, at the screwthreaded bores 9a provided there at corresponding positions, and is thus secured to the restraining bow frame 7 by way of the carrier element 9, whereas the second hollow cylinder 12 is screwed by way of screwthreaded bores 12b to an inner carrier plate member 19 (indicated in FIG. 2c).

In the starting condition when the locking system 8 is closed and the restraining bow frame 7 is in the securing position the compression spring 13 is stressed to the maximum within the rotary guide element 10. When the locking system 8 is opened the restraining bow frame 7 initially opens laterally outwardly (in the illustrated embodiment through an angle of 5°) as a consequence of the force of the spring elements 18, as already described hereinbefore. After the spring elements 18 have opened the restraining bow frame 7 laterally somewhat, so that it projects partially beyond the vehicle contour, the above-described movements are effected in the form of the superimpositioning of the axial movement caused by the compression spring 13 and the rotary movement, caused by the ball rolling mounting, of the hollow cylinders 11 and 12 relative to each other and the corresponding pivotal movement of the restraining bow frame 7, as a consequence of the restraining bow frame 7 being coupled to the vehicle by way of the rotary guide element 10 and the compression spring 13 accommodated thereby. The above-described structure of the rotary guide element 10 provides at the same time for efficient axial guidance during that movement.

During the axial movement the restraining bow frame 7 is moved continuously into the region outside the cab or vehicle contour and thus permits the pivotal movement into the release position without the restraining bow frame 7 itself or attachments mounted thereto such as cushions striking against the cab or vehicle contour.

The compression spring 13 is preferably so designed that the pivotal movement which is caused by the compression spring 13 and which has a rotary movement about the element axis superimposed thereon by virtue of the rotary guide element 10 already takes place at a minimum manual application of force, that is to say the force of gravity acting on the restraining bow frame 7 and the frictional forces involved are overcome by the action of the compression spring 13. In other words the compression spring 13 is preferably so designed that at any time there is an equilibrium of forces as between the spring force on the one hand and the gravitational and frictional forces to be overcome on the other hand, and the restraining bow frame 7 therefore practically always remains stationary of its own accord and only a minimal amount of help is needed to pivot it into the release position. For that purpose the compression spring 13 can have in particular a linear or slightly regressive characteristic.

In addition the compression spring 13 is preferably so designed that it is relieved of stress in the end position corresponding to the release position and defined by the abutment of the balls 16 within the grooves 12a, thereby avoiding or minimizing wear effects.

It is to be observed that the rotary guide element 10 or the corresponding apparatus for coupling two components together is not limited to use in connection with the driver protection system according to the invention. Rather, the effect achieved by the rotary guide element 10, namely the combination of a defined rotary movement or rotation about an axis with an axial movement or translatory movement along that axis can in principle also be advantageously employed for other uses in which two external components (for example levers) which are mounted at both sides to the rotary guide element are not only to be rotated relative to each other through a predeterminable angle, but in that rotation are at the same time also to be moved towards or away from each other in the axial direction.

In that respect the use of a compression spring 13 for producing force in an axial direction or for implementing a translatory movement also represents only one of many possible options. Alternatively for example force generation in the axial direction can also be effected by a suitable pneumatic or hydraulic system. In addition, varying the geometry of the rotary guide element 10, in particular in regard to the inclination of the helical line described by the grooves 12a on the outside surface of the second hollow cylinder 12 on the one hand and the axial extent of the rotary guide element 10 on the other hand makes it possible to produce a link or transmission ratio between the rotary and translatory movements, that is desired for the respective use. In that way, besides the pivot angle produced according to the invention of substantially 90°, it is also possible to set any other pivot angles (for example of 180° or 270°). In addition, in accordance with the respective requirements involved, it is also possible to permit a rotation through more than 360°, in particular also through a multiple of 360°.

Referring again to FIGS. 4a-d, in the illustrated embodiment the pivot axis of the described pivotal movement which corresponds to the element axis of the rotary guide element 10 is inclined upwardly with respect to the horizontal through an angle of about 2.5°. In dependence on the structural factors involved a different angle of inclination, preferably in the range of between 2° and 6°, can also be adopted. In addition it is also possible to dispense entirely with an inclination.

Figure 4A:
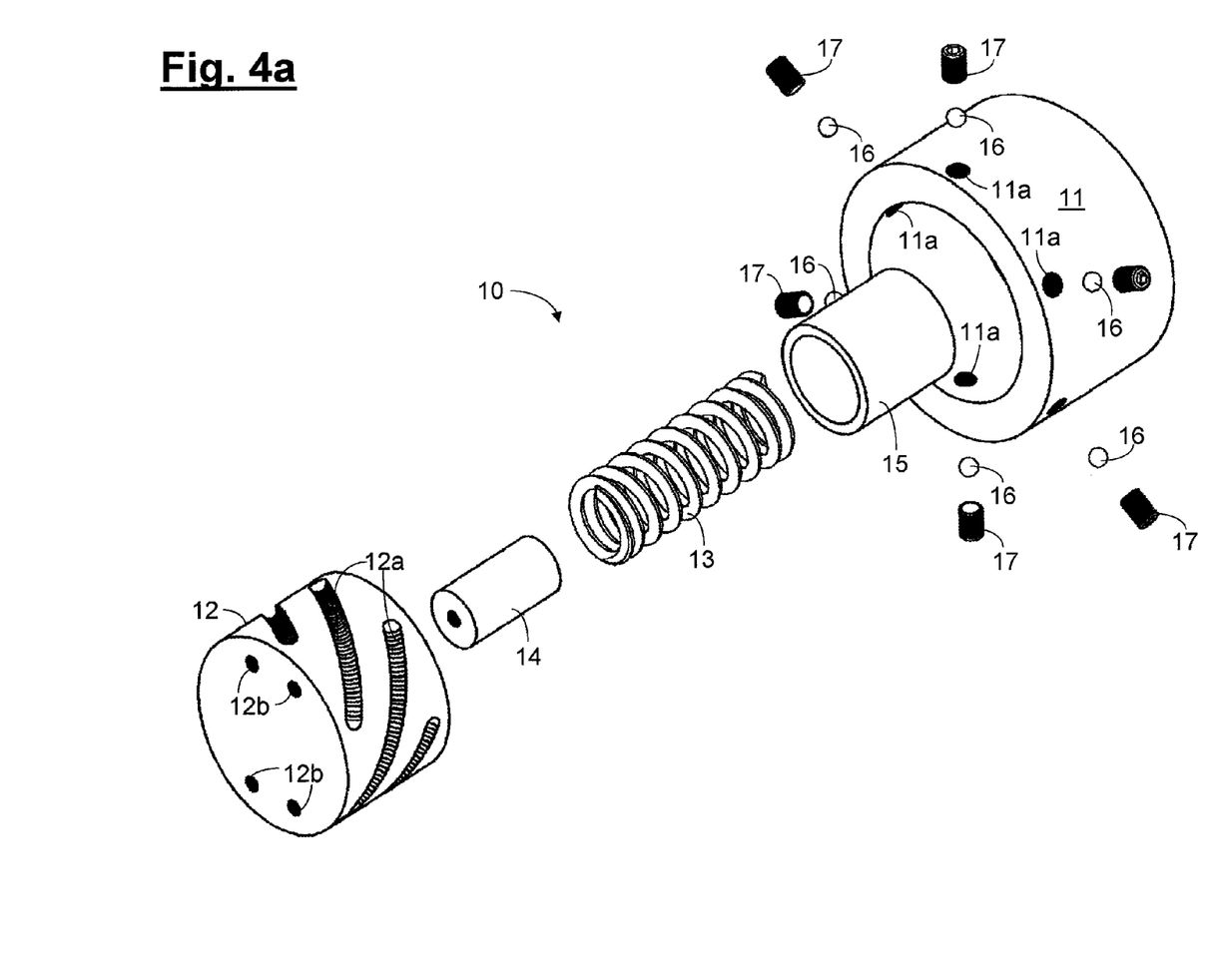
Figure 4B:
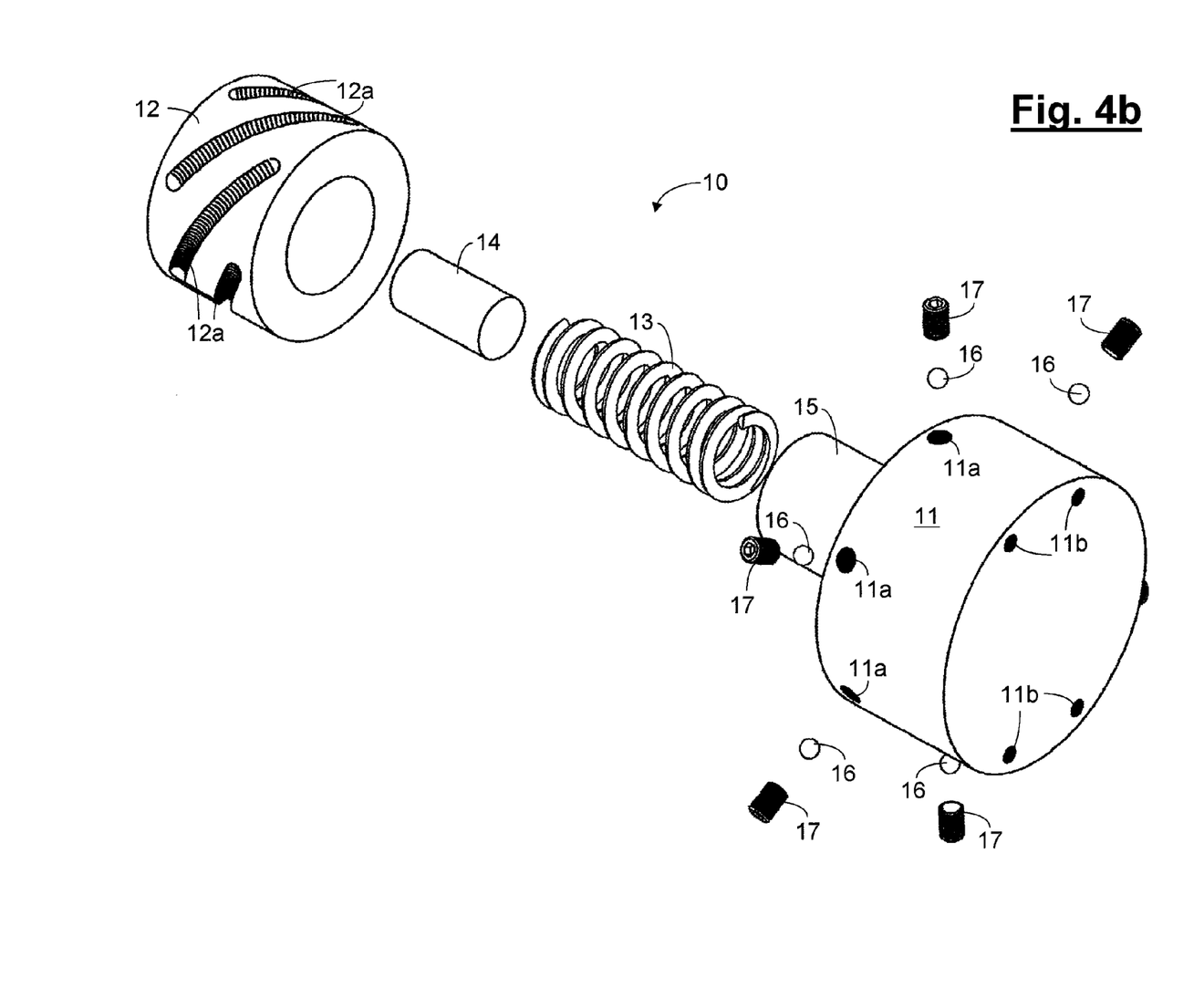
Figure 4C:
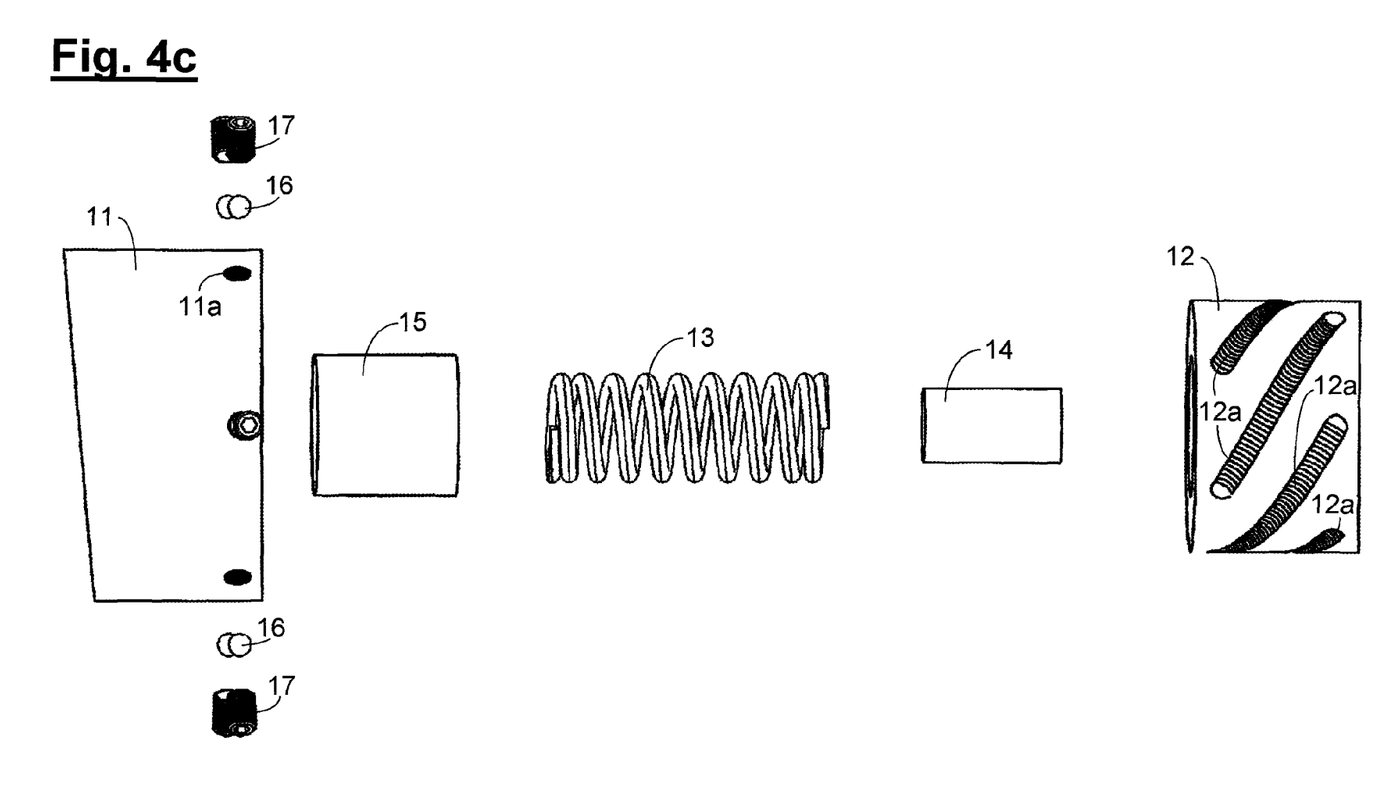
Figure 4D:
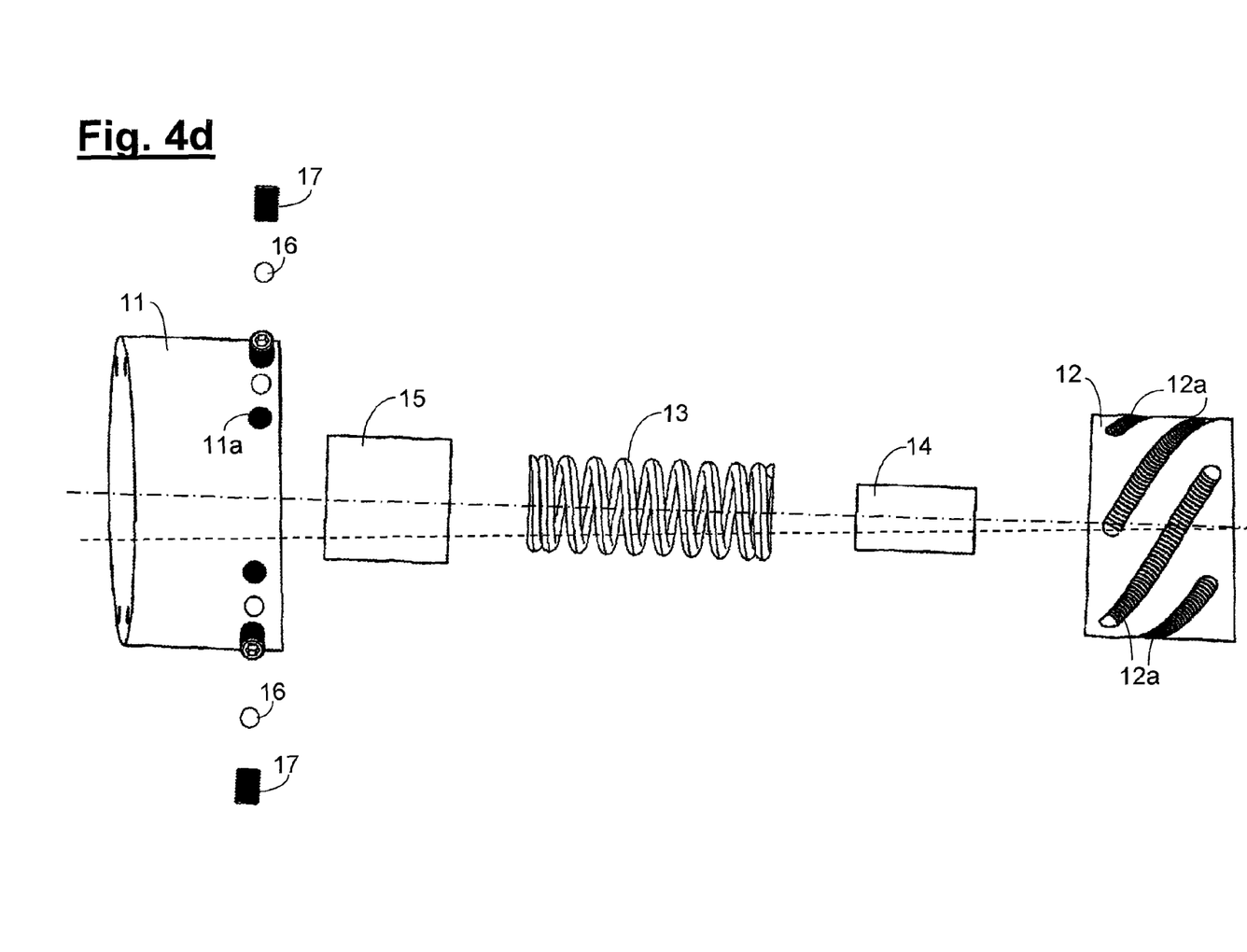

The inclination of the pivot axis with respect to the horizontal can be implemented as shown in FIG. 4d in that the hollow cylinder 11 is arranged in such a way that it is disposed with its cylinder axis initially at an inclination of for example 2.5° relative to the horizontal, the two end faces are then 'cut on the bevel' in such a way that they extend parallel to each other and to the vertical and finally the hollow cylinder 11 is provided with an outer bevel of 5° (see FIG. 4c). Alternatively it is also possible to use a carrier plate member having a bend or fold through an angle of 5°, in which case the spring plate element is then screwed to that angled region.

As a consequence of the upward inclination of the pivot axis, that provides that the opening movement of the restraining bow frame 7 out of the vehicle contour (outwardly through 5° in the example), caused after release of the locking system 8 at the beginning of the upward movement of the restraining bow frame 7 by the spring elements 18, is compensated again towards the end of the pivotal movement and this avoids an otherwise possible threat of the restraining bow frame 7 striking against obstacles.

Although in the described embodiment the translatory movement of the restraining bow frame 7 transversely with respect to the longitudinal direction of the vehicle is effected simultaneously with the pivotal movement as a combined or superimposed movement, the invention is not limited thereto. Thus in an alternative embodiment the translatory movement can also be effected independently of the pivotal movement, insofar as for example firstly the restraining bow frame is displaced out of the securing position axially in the direction of the pivot axis and is only then pivoted into the upright or release position.

Even if the invention has been described by reference to specific embodiments numerous variations and alternative embodiments will be apparent to the man skilled in the art, for example by combination and/or exchange of features of individual embodiments. Accordingly it will be appreciated by the man skilled in the art that such variations and alternative embodiments are also embraced by the present invention and the scope of the invention is limited only in the sense of the accompanying claims and equivalents thereof.

LIST OF REFERENCES 1 driver protection roof
2 lateral opening
3 front pillar
4 rear pillar
5 upper transverse frame member
6 vehicle seat
7 restraining bow frame
8 locking system
9 carrier element
9a screwthreaded bores
10 rotary guide element
11 first hollow cylinder
11a screwthreaded bores
12 second cylinder
12a groves
12b screwthreaded bores
13 compression spring
14 bar
15 sleeve
16 balls
17 screws
18 spring elements
19 carrier plate member

The invention claimed is:

1. A driver protection system for a vehicle comprising
a restraining bow frame which is pivotable about a pivot axis between a securing position in which the restraining bow frame secures a driver from falling out of the vehicle and a release position in which the restraining bow frame permits the driver to climb out of the vehicle; wherein the restraining bow frame in the release position is displaced relative to the securing position in the direction of the pivot axis.

2. A driver protection system as set forth in claim 1, wherein the restraining bow frame in the release position assumes an at least approximately vertical position.

3. A driver protection system as set forth in claim 1, wherein the pivotal movement of the restraining bow frame from the securing position into the release position is effected with a pivotal angle of $90°\pm20°$.

4. A driver protection system as set forth in claim 1, wherein the pivot axis extends transversely relative to the longitudinal direction of the vehicle.

5. A driver protection system as set forth in claim 1, wherein, in the pivotal movement, the restraining bow frame performs a movement in the direction of its pivot axis.

6. A driver protection system as set forth in claim 5, wherein the movement is assisted by a force transmission element.

7. A driver protection system as set forth in claim 1, wherein the displacement in the direction of the pivot axis in the transfer from the securing position into the release position is effected over a distance of at least 15 mm.

8. A driver protection system as set forth in claim 1, wherein the pivot axis is arranged at an angle of $0°\pm10°$ relative to a horizontal plane.

9. A driver protection system as set forth in claim 8, wherein the pivot axis is inclined relative to the horizontal plane through an angle of inclination, the absolute magnitude of which is at least $1°$.

10. A driver protection system as set forth in claim 1, wherein the restraining bow frame is so mounted to the vehicle that superimposed on the pivotal movement is a translatory movement of the restraining bow frame, that is oriented transversely relative to a longitudinal direction of the vehicle.

11. A driver protection system as set forth in claim 1, wherein the securing position for the restraining bow frame is at least partially still within the vehicle contour.

12. A driver protection system as set forth in claim 1, wherein the release position for the restraining bow frame is completely outside the vehicle contour.

13. A driver protection system as set forth in claim 1, wherein a lateral opening is provided on the vehicle for exit of the driver, wherein, in the securing position, the restraining bow frame extends in a longitudinal direction of the vehicle substantially over the entire extent of the lateral opening at the level of the restraining bow frame.

14. A driver protection system as set forth in claim 1, wherein, in the securing position, the restraining bow frame is held releasably to a pillar of the vehicle by way of a locking system.

15. A driver protection system as set forth in claim 1, wherein the restraining bow frame is mounted to a pillar of the vehicle by means of at least one spring element which is biased in the securing position.

16. A driver protection system as set forth in claim 15, wherein the spring element is a spring steel plate member.

17. A driver protection system as set forth in claim 15, wherein the restraining bow frame is moved by the spring element after release of the locking system from a position of being oriented in a longitudinal direction of the vehicle into an at least partially sideways-open position.

18. A driver protection system as set forth in claim 17, wherein the restraining bow frame is at least partially still within the vehicle contour in the at least partially sideways-open position.

19. A driver protection system as set forth in claim 1, wherein the restraining bow frame is secured to the vehicle by way of a compression spring which at least one of assists and causes the at least one of displacement and movement of the restraining bow frame in the direction of the pivot axis.

20. A driver protection system as set forth in claim 1, wherein the restraining bow frame is secured to the vehicle by way of a rotary guide element which is so adapted that it superimposes a translatory movement of the restraining bow frame on the pivotal movement of the restraining bow frame.

21. A driver protection system as set forth in claim 20, wherein the rotary guide element accommodates the compression spring.

22. Apparatus for coupling two components together, in particular for use in a driver protection system as set forth in claim 1, comprising:
    a ball rolling mounting;
    a first subelement for fixing to a first component, said first subelement includes a first hollow cylinder;
    a second subelement for fixing to a second component, said second subelement includes a second hollow cylinder mounted concentrically relative to said first hollow cylinder with said ball rolling mounting; and
    a force transmission element for transmission of a force causing the relative movement to the first subelement and the second subelement, said force transmission element includes a compression spring;
    wherein the first subelement and the second subelement are operatively connected together in such a way that a relative movement between the first subelement and the second subelement, along an element axis of the apparatus, is necessarily accompanied by a rotary movement of the first subelement and the second subelement relative to each other about the element axis.

23. Apparatus as set forth in claim 22, wherein the first subelement and the second subelement are arranged coaxially in relation to a common axis.

24. Apparatus as set forth in claim 23, wherein the common axis is the element axis.

25. A utility vehicle comprising the driver protection system as set forth in claim 1.

26. A driver protection system for a vehicle comprising:
    a restraining bow frame which is pivotable about a pivot axis between
        a securing position in which the restraining bow frame secures a driver from falling out of the vehicle and
        a release position in which the restraining bow frame permits the driver to climb out of the vehicle;
    ball bearings;
    a first hollow cylinder attached to said restraining bow frame;
    a second hollow cylinder capable of attachment to a vehicle frame, said second hollow cylinder mounted concentrically within said first hollow cylinder with said ball bearings between said first hollow cylinder and said second hollow cylinder, said second hollow cylinder includes a plurality of spiral grooves on an outside surface in which said ball bearings travel; and
    a force transmission element for transmission of a force to move said first hollow cylinder relative to said second hollow cylinder, said force transmission element includes a compression spring, and
    wherein as said first hollow cylinder and said second hollow cylinder are rotated relative to each other, said first hollow cylinder moves laterally along the pivot axis and said second hollow cylinder; and
    when said restraining bow frame is in the release position, said restraining bow frame is moved further from said second hollow cylinder along the pivot axis than when said restraining bow frame is in the securing position.

* * * * *